Dec. 6, 1966 M. FRÖLICH 3,289,569
APPARATUS FOR HEATING LIQUID, PARTICULARLY
FOR STERILIZING MILK
Filed Sept. 2, 1964 3 Sheets-Sheet 1

Inventor:
MARTIN FRÖLICH
BY K.A. Mayr.
ATTORNEY.

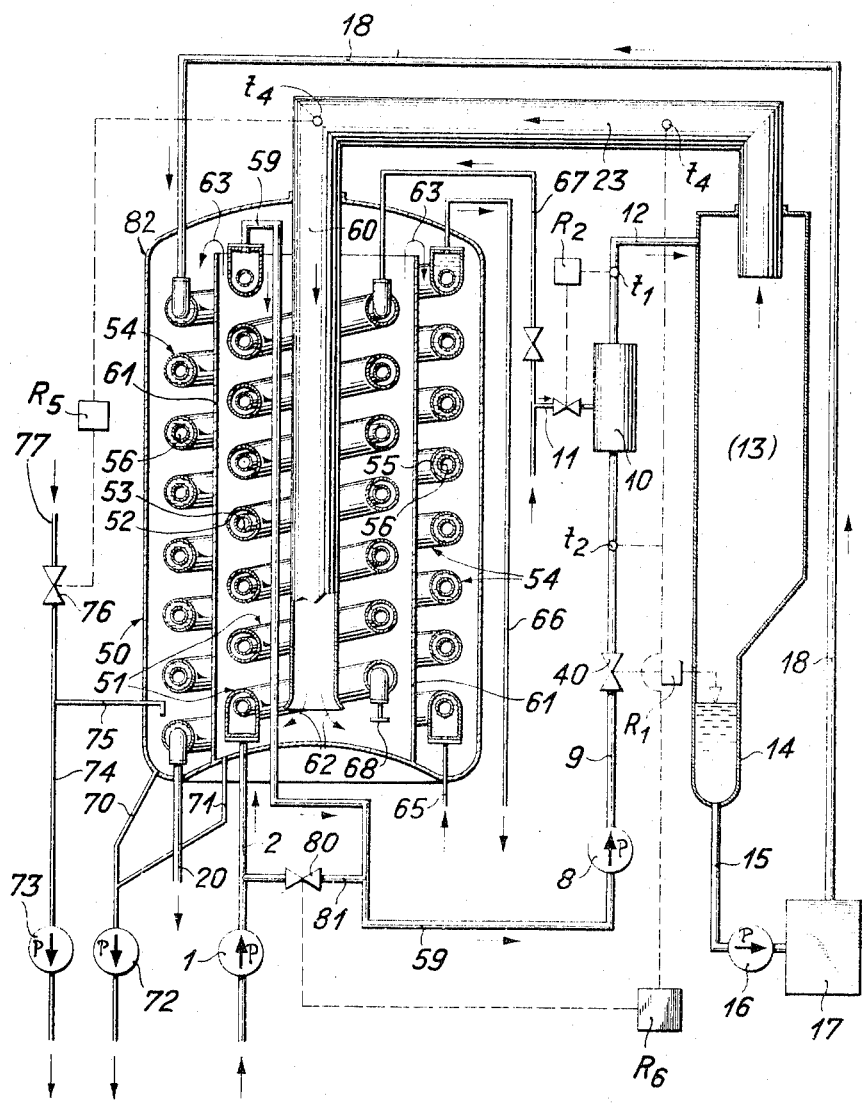

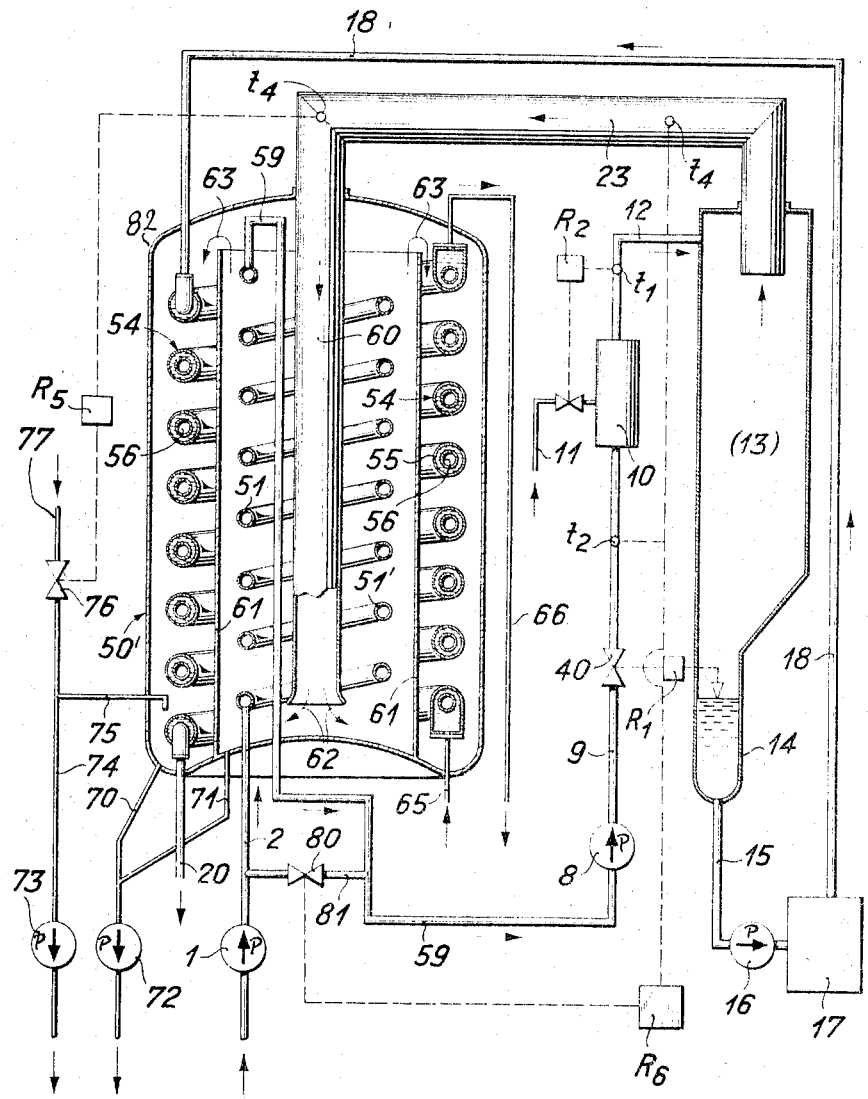

United States Patent Office 3,289,569
Patented Dec. 6, 1966

3,289,569
APPARATUS FOR HEATING LIQUID, PARTICULARLY FOR STERILIZING MILK
Martin Frölich, Raterschen, Switzerland, assignor to Sulzer Brothers Limited, Winterthur, Switzerland, a corporation of Switzerland
Filed Sept. 2, 1964, Ser. No. 393,943
Claims priority, application Switzerland, Sept. 4, 1963, 10,922/63
13 Claims. (Cl. 99—251)

The present invention relates to an apparatus for temporarily heating liquids, more particularly for sterilizing milk, whereby the liquid is preheated in at least one preheater, subsequently heated by admixture of steam, and thereupon expanded and cooled. The liquid is finally cooled by heat transfer to a coolant.

This kind of heat treatment is particularly important for milk which is heated during a very short time, which may be less than one second, to a temperature for example 150° C., sufficient for destroying all germs whereby the immediately following cooling by expansion prevents an undesired change of the milk.

In plants of this type the heat of the vapor generated during expansion of the liquid is used for preheating the liquid supplied to the plant. For this purpose the vapor is conducted into a preheater wherein the heat in the vapor is transferred to the liquid to be heated. The liquid, for example milk, may be subsequently heated in an additional preheater which receives heat from an extraneous source, for example from hot water or live steam, to a desired temperature before the milk is pumped under a suitable pressure to a device wherein heating is effected by admixture of live steam to a temperature at which all germs in the milk are completely destroyed. After this final heating the milk is expanded and thereby cooled and is usually supplied by a pump to a homogenizing apparatus whereafter the homogenized milk is cooled in a cooler, using, for example, cold water as a coolant, before the milk is supplied, for example, to a filling apparatus. Vapor which has not been used for preheating is condensed in a condenser.

In the conventional plants the vapor-heated preheater, the additional preheater, if any, which is heated by an independent heat source, the cooler arranged before the milk enters the filling apparatus and the condenser are separate pieces of equipment. This has the disadvantage that the entire plant comprises several heat-exchange vessels and a great number of unenclosed pipe connections between the individual vessels. Considering that it is customary to polish the unenclosed, rustproof parts of the apparatus it is obvious that provision of the several independent heat exchangers with the accompanying unenclosed pipe connections is expensive. Besides, a plant of this type is confusing to the supervising personnel.

It is an object of the invention to provide an apparatus wherein the number of heat exchange vessels and pipes and fittings interconnecting the vessels is substantially reduced so that manufacturing costs are reduced and the apparatus can easily be supervised.

The apparatus according to the invention comprises only one heat exchange apparatus wherein at least one device for preheating the liquid by means of vapor generated in the plant by expansion of the heated and pressurized liquid and a device for cooling the treated liquid by heat transfer to a coolant are combined and placed in a common vessel, and the device for cooling the liquid includes an additional heat-exchange surface for condensing vapors which cannot be utilized.

If it is necessary to preheat by an extraneous heating agent in addition to preheating by vapors generated during expansion of the heated liquid the device for preheating the liquid may be provided with an additional heating surface within the heat-exchange apparatus wherein the liquid is heated by the extraneous heating agent to the desired preheat temperature.

The device for preheating the liquid in the heat exchange apparatus is preferably in the form of a tube coil consisting of two concentric and radially spaced tubes. The liquid to be preheated is preferably conducted through the annular space between the two tubes whereas a supplemental heating agent is conducted through the inner one of the two tubes. Particularly favorable thermal conditions are obtained if the heating agent and the liquid to be preheated flow in opposite directions.

In a further development of the invention the device for cooling the liquid in the heat exchange apparatus by heat transfer to a coolant comprises two concentric, radially spaced tubes. The coolant is preferably conducted through the annular space between the two tubes and the liquid to be cooled is conducted through the inner one of the two tubes. The coolant and the liquid to be heated are preferably caused to flow in opposite directions. Vapor to be condensed is preferably conducted around the outside of the outer of the two tubes and in opposite direction to the flow of the coolant through the annular space between the two tubes.

The tube coils for preheating the liquid and for cooling the liquid preferably have a helical configuration. The two helical coils are preferably placed in concentric relation. It is of advantage to place the helical coil wherein the liquid is preheated inside the helical coil wherein the liquid s cooled.

The heat transfer apparatus may comprise means for guiding the vapor along the preheating coil and along the cooling coil. If these coils are helical and concentric the means for guiding the vapor is preferably in the form of a cylindrical baffle placed coaxial of and between the two helical coils.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a schematic, part-sectional illustration of an apparatus combining, according to the invention, a number of elements which are separated in the conventional plant shown in FIG. 1.

FIG. 3 is a schematic, part-sectional illustration of a modified apparatus according to the invention.

Figure 1:
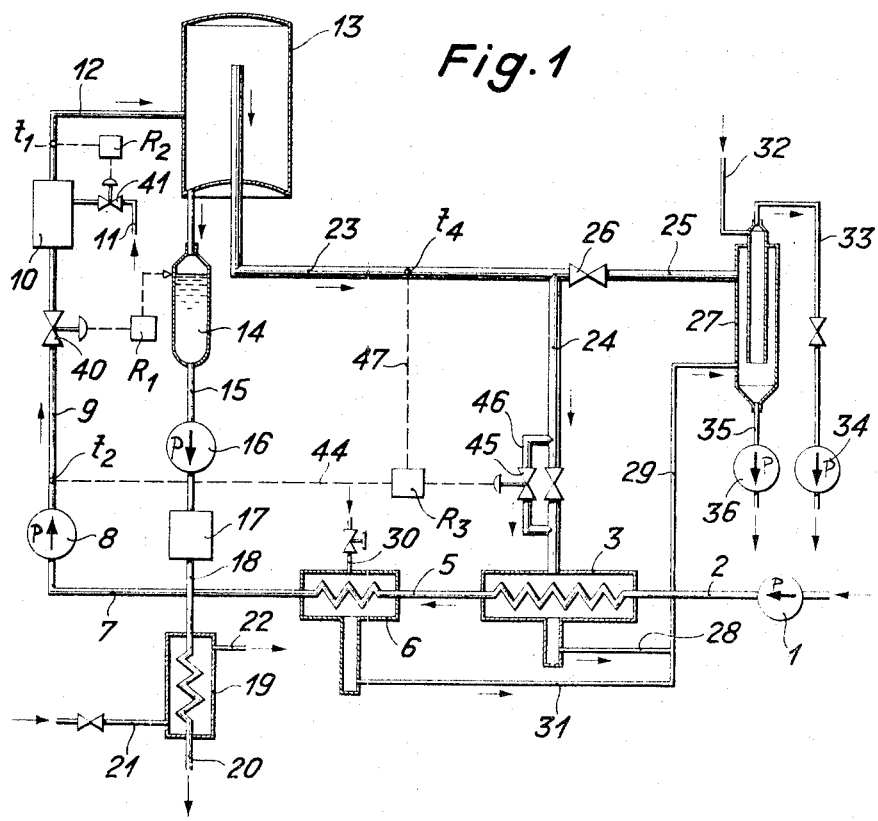
FIG. 1 is a diagrammatic illustration of a conventional plant for temporarily heating liquids, particularly milk.

Referring more particularly to FIG. 1, the cold, raw milk is pumped from a storage tank, not shown, by means of a pump 1 and conducted through a pipe 2 to a preheater 3 and therefrom through a pipe 5 to an additional preheater 6. The milk flows from the preheater 6 through a pipe 7 to a further pump 8 for pumping the liquid under a suitable pressure, for example approximately 8 atmospheres, through a pipe 9 to a device 10 wherein the milk is heated by direct admixture of live steam to a suitable temperature, for example 150° C. The device 10 receives live steam from a pipe 11. After heating in the device 10 the milk flows through a pipe 12 wherein the milk dwells during a predetermined relatively short time, usually about two seconds, to an expansion chamber 13 wherein the temperature of the milk is quickly reduced by expansion to a suitable temperature, for example 80° C., in order to avoid undesired changes of the milk. The expanded milk flows into a leveling container 14 and is pumped therefrom through a pipe 15 by means of a pump 16 under a relatively high pressure, for example approximately 200 atmospheres, to a conventional homogenizing apparatus 17 wherein the fat particles in the milk are extensively fractured so that creaming is avoided even if the milk is stored for a considerable period of time. After leaving the homogenizing device 17 the milk is conducted through a pipe 18 into a heat exchanger 19 wherein it is cooled to a desired temperature before the milk flows through a pipe 20, for example, to a filling apparatus, not shown. The heat exchanger 19 receives a coolant through a pipe 21, for example cold water, which is released from the heat exchanger 19 through a pipe 22.

The vapor generated in the expansion chamber 13 is removed from the chamber through a pipe 23 and conducted through a pipe 24 as a heating agent to the preheater 3. Surplus vapor which cannot be utilized for preheating the raw milk in the preheater 3 is conducted through a pipe 25 wherein a valve 26 is interposed to a condenser 27 and condensed therein. The vapor condensate which is produced in the preheater 3 is conducted to the condenser 27 through pipes 28 and 29. The additional preheater 6 is supplied with a heating agent from an independent source, for example, with live steam through a pipe 30. The condensate of the live steam resulting in the preheater 6 is conducted into the condenser 27 through pipes 31 and 29.

The condenser 27 receives cooling water through a pipe 32 in the conventional manner. Air is removed from the condenser through a pipe 33 by means of an air pump 34 to obtain a desired low pressure in the condenser, for example, a pressure which is lower than the pressure in the vapor space of the preheater 3. The water sprayed into the condenser and the condensate produced therein are removed by means of a pump 36 through a pipe 35.

The rate of flow of milk to the device 10 is controlled by means of a valve 40 which is actuated by a regulator $R_1$ in response to the liquid level in the leveling container 14. Supply of live steam through the pipe 11 to the device 10 is controlled by a valve 41. The latter is actuated by a regulator $R_2$ in response to the temperature $t_1$ of the mixture in the pipe 12.

For controlling the preheat temperature $t_2$ a temperature-sensing device is connected to the pipe 9 and produces a signal which is conducted through a conduit 44 to a regulator $R_3$. The regulator $R_3$ produces a signal corresponding to the deviation of the temperature $t_2$ from a desired temperature, for actuating a valve 45 interposed in a by-pass conduit 46 which is arranged in parallel relation to the pipe 24. This regulating system opens the valve 45 upon dropping of the temperature $t_2$ so that the condensation pressure in the preheater 3 is increased; the valve 45 is actuated in the closing direction upon an increase of the temperature $t_2$. It is of advantage to compare the temperature $t_2$ in the regulator $R_3$ with a set point signal which is adjusted in a predetermined manner in response to changes of the expansion temperature $t_4$ in the vapor pipe 23. For this purpose a temperature-sensing device is connected to the pipe 23 which temperature-sensing device is operatively connected through a signal conduit 47 to the regulator $R_3$.

In the aforedescribed system, which is state of the art, the preheaters 3 and 6, the cooler 19 and the condenser 27 are formed by separate heat exchangers. This results in an expensive and space-consuming arrangement which is difficult to supervise. The apparatus described below avoids these disadvantages of the conventional arrangements.

In the embodiment of the invention shown in FIG. 2 the preheaters 3 and 6, the cooler 19 and the condenser 27 form a compact, unified heat exchange apparatus 50 which is enclosed in a single vessel 82. The heat exchange apparatus includes an inner tube coil 51 formed of two concentric and radially spaced tubes 52, 53. The apparatus includes an outer tube coil 54 which also consists of two radially spaced, concentric tubes 55, 56. The cold, raw milk is received from a storage vessel, not shown, and is pumped by a pump 1 through a pipe 2 into the annular space between the tubes 52 and 53 of the inner tube coil 51. The milk is preheated in this tube coil and conducted through a pipe 59 to a pump 8 which pumps the preheated milk through a pipe 9 at a suitable pressure into a heating device 10. The milk flows from the device 10 through a pipe 12 wherein the milk dwells a predetermined period of time, into an expansion chamber 13 and therefrom into a leveling container 14 from which the milk flows through a pipe 15 to a pump 16 which forces the milk into a homogenizing device 17. The milk flows from the device 17 through a pipe 18 into a cooler corresponding to the heat exchanger 19 in FIG. 1. This cooler is formed by the outer tube coil 54. The milk flows through the inner tube 56 of this tube coil and is conducted therefrom through a pipe 20, for example, to a filling plant, not shown. The vapor generated in the expansion chamber 13 is conducted through a pipe 23 into a tube 60 extending vertically downward in the center of the vessel 82. The lower end of the tube 60 is open and above the bottom of the vessel 82 so that the vapor enters the lower part of the vessel. A cylindrical baffle 61 is placed coaxially with and between the inner tube coil 51 and the outer tube coil 54. The upper end of this baffle is spaced from and below the top of the vessel 82. The vapor leaving the lower end of the tube 60 and entering the vessel 82 in the direction of the arrows 62 flows in upward direction around the inner tube coil 51. The flow of the vapor is reversed at the upper edge of the baffle 61 as indicated by arrows 63 and the vapor flows in a downward direction around the outer tube coil 54.

A coolant, for example cold water, is supplied through a pipe 65 into the annular space between the tubes 55 and 56 of the outer tube coil 54. The coolant is released from the outer tube coil 54 through a pipe 66.

Live steam is supplied as a heating agent through a conduit 67 to the inner tube 53 of the inner tube coil 51. The condensate formed in the tube 53 is discharged at 68 into the vessel 82.

In the arrangement shown in FIG. 2 the milk conducted through the annular space between the concentric tubes forming the inner tube coil is preheated by condensing vapor which flows around the inner tube coil and by condensing heating steam which is conducted through the inner tube 53 of the inner tube coil 51.

The milk which has been cooled by expansion in the expansion chamber 13 is further cooled before it is conducted, for example, to a filling plant, in the inner tube 56 of the outer tube coil 54 by a coolant flowing through the annular space between the inner tube 56 and the outer tube 55 of the outer tube coil 54. The coolant flowing through this annular space absorbs heat from the vapor surrounding the outer tube coil 54 and condenses the vapor. The condensate accumulating in the vessel 82 is removed through pipes 70 and 71 by means of a pump 72.

It has been found to be of advantage if the two fluids flowing through the outer tube coil are conducted in opposite directions.

An air pump 73 connected through pipes 74 and 75 to the interior of the vessel 82 causes a desired low pressure in the vessel. By actuation of a valve 76 by means of a regulator $R_5$ which valve is in a pipe 77 which is connected to and admits atmospheric air into the pipe 74, the pressure in the vessel 82 can be controlled and thereby a desired value of the temperature $t_4$ of the vapor entering the vessel 82 can be maintained.

The valve 76 can be controlled differently, for example, in dependence on the expansion pressure in the vessel 82.

The preheat temperature $t_2$ of the milk which is the controlled condition of the system is compared with a set point depending on the vapor temperature $t_4$ and a valve 80 in a by-pass conduit 81 is controlled by an automatic controller $R_6$ according to the result of said comparison. If the preheat temperature $t_2$ is too high the valve 80 is opened so that cold, raw milk is admixed to the preheated milk flowing in the pipe 59. If the preheat temperature $t_2$ is too low the valve 80 is actuated in closing direction. The control of the preheat temperature $t_2$ may be done in a different way, for example by controlling heating steam supplied to the inner tube 53 of the inner tube coil 51.

The control of the live steam supply through the pipe 11 to the heating device 10 is effected in the manner as described in connection with the description of FIG. 1, namely, in dependence on the temperature $t_1$ measured in the pipe 12. The rate of flow of the milk in the pipe 9 is also controlled in the same manner as described with reference to FIG. 1, i.e., in dependence on the liquid level in the container 14.

FIG. 3 illustrates an embodiment of the invention wherein the milk is preheated only by vapors produced during the treatment of the milk and not additionally by another heating agent. The plant shown in FIG. 3 is like the plant shown in FIG. 2, with the exception that the raw milk to be preheated is conducted through the pipe 2 into an inner tube coil 51' which is formed by a single, helically shaped tube and not by two concentric tubes as in the example shown in FIG. 2. The preheated milk leaving the coil 51' is conducted through a pipe 59 to a pump 8 and therefrom to the heating device 10 which is supplied with heating steam through the pipe 11. The further path of the milk is like the path of the milk in the example shown in FIG. 2. The supply of vapor into the vessel 82 and the removal of the condensate therefrom is also as in the example shown in FIG. 2.

It is within the scope of the present invention to provide in the embodiment shown in FIG. 3 additional preheating by means of an additional heating agent whereby the milk preheated in the coil 51' is conducted through a heat exchanger after leaving the apparatus 50' for obtaining a desired preheat temperature.

I claim:

1. An arrangement for temporarily heating a liquid, more particularly for sterilizing milk, comprising:
   a heat exchange apparatus including a vessel,
   tubular heat exchange means placed in said vessel,
   means for supplying liquid to be heated to said heat exchange means for preheating the liquid,
   means for mixing the preheated liquid with live steam for heating the liquid to the desired temperature,
   conduit means connecting said mixing means to said tubular heat exchange means for conducting the preheated liquid from the latter to the former, said conduit means including means for increasing the pressure of the preheated liquid,
   expansion means connected to said mixing means for receiving heated liquid therefrom and for expanding and cooling the liquid and releasing vapor therefrom,
   said expansion means being connected to said vessel for conducting the vapor released in said expansion means into said vessel for heating said tubular heat exchange means for preheating said liquid and condensing a portion of the vapor,
   cooling means placed in said vessel and connected to said expansion means for receiving liquid wherefrom vapor has been released,
   means conducting a coolant in heat exchange relation with said cooling means in said vessel, and
   means for conducting the uncondensed portion of the vapor in said vessel in heat exchange relation with said coolant conducting means for condensing the portion of the vapor which has not been condensed when heating said tubular heat exchange means and preheating the liquid.

2. An arrangement as defined in claim 1 comprising guide means in said vessel for consecutively guiding the vapor alongside said heat exchange means and said cooling means.

3. An arrangement as defined in claim 1 wherein said tubular heat exchange means comprises means for conducting an extraneous heating agent in heat exchange relation to said tubular heat exchange means for supplementally heating the liquid to be heated.

4. An arrangement according to claim 3 wherein said tubular heat exchange means includes two tubes, one of said tubes being concentric in and radially spaced from the second tube, the first tube forming said conducting means for the extraneous heating agent, and means are provided for conducting the liquid to be heated through the space between said tubes.

5. An arrangement according to claim 4 wherein means are provided for conducting the liquid to be heated in opposite direction to said extraneous heating agent.

6. An arrangement as defined in claim 1 wherein said cooling means includes two concentric, radially spaced tubes, and means are provided for conducting the coolant through one of said tubes and the liquid through the second of said tubes.

7. An arrangement according to claim 6 wherein said means for conducting the coolant and the liquid through said tubes is capable of conduting the liquid through the inner one of said tubes and the coolant through the space between said tubes.

8. An arrangement according to claim 7 wherein said means for conducting the coolant and the liquid through said tubes is capable of conducting the liquid and the coolant in opposite directions through said tubes.

9. An arrangement according to claim 8 including means for conducting the vapor in said vessel in opposite direction to the coolant flowing through the space between said tubes.

10. An arrangement for temporarily heating a liquid, more particularly for sterilizing milk, comprising:
    a heat exchange apparatus including a vessel,
    a tubular heat exchange means including a tube forming a helical coil placed in said vessel,
    means for conducting the liquid to be heated through said tube for preheating the liquid,
    means for mixing the preheated liquid with live steam for heating the liquid to the desired temperature,
    conduit means connecting said mixing means to said tubular heat exchange means for conducting the preheated liquid from the latter to the former, said conduit means including means for increasing the pressure of the preheated liquid,
    expansion means connected to said mixing means for receiving heated liquid therefrom and for expanding and cooling the liquid and releasing vapor therefrom,
    said expansion means being connected to said vessel for conducting the vapor released in said expansion means into said vessel for heating said tube for preheating the liquid and condensing a portion of said vapor,
    cooling means placed in said vessel and including two concentric, radially spaced tubes, and means for conducting a coolant through one of said tubes, the second tube being connected to said expansion means for receiving liquid wherefrom vapor has been released,
    said tubes of said cooling means forming a helical coil concentric of the coil formed by the tube of said heat exchange means, and
    means for conducting the uncondensed portion of the vapor in said vessel in heat exchange relation with said cooling means for condensing the portion of the vapor which has not been condensed when heating said tubular heat exchange means and preheating the liquid.

11. An arrangement as defined in claim 10 wherein said tubular heat exchange means includes two concentric, radially spaced tubes forming a helical coil, means for conducting an extraneous heating agent through one of said tubes of said tubular heat exchange means, and means for conducting the liquid to be heated through the second of said tubes of said tubular heat exchange means for preheating the liquid.

12. An arrangement as defined in claim 11 wherein the helical coil formed by said heat exchange means is inside the helical coil formed by said tubes of said cooling means.

13. An arrangement as defined in claim 12 comprising a cylindrical baffle placed coaxially of and between said helical coils for guiding the vapor consecutively alongside said tubular heat exchange means and said cooling means.

References Cited by the Examiner

UNITED STATES PATENTS

| | | | |
|---|---|---|---|
| 2,846,320 | 8/1958 | Wittwer | 99—251 |
| 3,150,713 | 9/1964 | Loliger | 99—251 |
| 3,231,009 | 1/1966 | Loliger | 99—251 |

WALTER A. SCHEEL, *Primary Examiner.*

R. W. JENKINS, *Assistant Examiner.*